(12) United States Patent
Shimizu et al.

(10) Patent No.: US 9,179,154 B2
(45) Date of Patent: *Nov. 3, 2015

(54) VIDEO ENCODING CONTROL METHOD AND APPARATUS

(75) Inventors: Atsushi Shimizu, Yokosuka (JP); Naoki Ono, Yokosuka (JP); Masaki Kitahara, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 13/695,768

(22) PCT Filed: Apr. 20, 2011

(86) PCT No.: PCT/JP2011/059727
§ 371 (c)(1),
(2), (4) Date: Nov. 1, 2012

(87) PCT Pub. No.: WO2011/138900
PCT Pub. Date: Nov. 10, 2011

(65) Prior Publication Data
US 2013/0058396 A1 Mar. 7, 2013

(30) Foreign Application Priority Data
May 6, 2010 (JP) .................................. 2010-106104

(51) Int. Cl.
*H04N 7/26* (2006.01)
*H04N 19/164* (2014.01)
(Continued)

(52) U.S. Cl.
CPC ........... *H04N 19/164* (2014.11); *H04N 19/124* (2014.11); *H04N 19/132* (2014.11); *H04N 19/152* (2014.11); *H04N 19/172* (2014.11); *H04N 19/61* (2014.11)

(58) Field of Classification Search
CPC ... H04N 19/172; H04N 19/61; H04N 19/164; H04N 19/132; H04N 19/152; H04N 19/124; H04N 7/50; H04N 7/26335; H04N 7/26707; H04N 7/26946; H04N 7/26244

USPC ...................................................... 375/240.25
See application file for complete search history.

(56) References Cited

U.S. PATENT DOCUMENTS 5,134,476 A 7/1992 Aravind et al.
5,606,369 A * 2/1997 Keesman et al. ........ 375/240.01
(Continued)

FOREIGN PATENT DOCUMENTS

CN 1353547 A 6/2002
CN 1926863 A 3/2007
(Continued)

OTHER PUBLICATIONS

Notice of Allowance, Japanese Patent Application No. 2014-028378, Nov. 11, 2014.
(Continued)

*Primary Examiner* — Shan Elahi
(74) *Attorney, Agent, or Firm* — Harness, Dickey & Pierce, P.L.C.

(57) ABSTRACT

A video encoding control method for controlling encoding of an input video signal. The method includes the steps of detecting an underflow of a decoder buffer; if the underflow of the decoder buffer has been detected, suppressing an amount of generated code by skipping an encoding target picture or by encoding the encoding target picture so as to produce a minimum amount of generated code; after suppressing the amount of generated code, comparing a current rate of occupancy in the decoder buffer with a predetermined threshold for the rate of occupancy in the decoder buffer; and performing a control for continuously suppressing the amount of code generated for each encoding target image by using the above step of suppressing the amount of generated code until the rate of occupancy in the decoder buffer exceeds the threshold based on a result of the above comparison.

4 Claims, 8 Drawing Sheets

(51) Int. Cl.
*H04N 19/172* (2014.01)
*H04N 19/61* (2014.01)
*H04N 19/124* (2014.01)
*H04N 19/132* (2014.01)
*H04N 19/152* (2014.01)

(56) References Cited

U.S. PATENT DOCUMENTS

| | | | |
|---|---|---|---|
| 5,786,858 A | 7/1998 | Yagasaki et al. | |
| 5,805,228 A * | 9/1998 | Proctor et al. | 375/240.22 |
| 5,831,678 A * | 11/1998 | Proctor | 375/240.22 |
| 5,864,681 A * | 1/1999 | Proctor et al. | 709/247 |
| 6,072,830 A * | 6/2000 | Proctor et al. | 375/240.22 |
| 6,101,195 A * | 8/2000 | Lyons et al. | 370/498 |
| 6,208,691 B1 | 3/2001 | Balakrishnan et al. | |
| 6,300,973 B1 | 10/2001 | Feder et al. | |
| 6,310,915 B1 * | 10/2001 | Wells et al. | 375/240.03 |
| 6,347,117 B1 | 2/2002 | Kato et al. | |
| 6,493,402 B1 | 12/2002 | Fimoff | |
| 6,522,693 B1 | 2/2003 | Lu et al. | |
| 6,678,332 B1 * | 1/2004 | Gardere et al. | 375/240.26 |
| 6,754,279 B2 | 6/2004 | Zhou et al. | 375/240.28 |
| 6,791,609 B2 * | 9/2004 | Yamauchi et al. | 348/273 |
| 6,792,047 B1 * | 9/2004 | Bixby et al. | 375/240.26 |
| 6,836,289 B2 * | 12/2004 | Koshiba et al. | 348/273 |
| 6,873,658 B2 * | 3/2005 | Zhou | 375/240.25 |
| 6,944,221 B1 | 9/2005 | Keesman | |
| 6,990,144 B2 | 1/2006 | Tsukagoshi et al. | |
| 7,023,924 B1 * | 4/2006 | Keller et al. | 375/240.26 |
| 7,099,389 B1 | 8/2006 | Yu et al. | |
| 7,346,106 B1 | 3/2008 | Jiang et al. | |
| 7,356,079 B2 | 4/2008 | Laksono et al. | |
| 7,613,345 B2 | 11/2009 | Kajiwara et al. | |
| 7,688,890 B2 * | 3/2010 | Kondo et al. | 375/240.03 |
| 7,970,055 B2 * | 6/2011 | Koto | 375/240.03 |
| 8,107,524 B2 * | 1/2012 | Laksono | 375/240.01 |
| 8,189,679 B2 * | 5/2012 | Tsukagoshi et al. | 375/240.25 |
| 2001/0003534 A1 * | 6/2001 | Saunders et al. | 375/240.16 |
| 2001/0045988 A1 * | 11/2001 | Yamauchi et al. | 348/273 |
| 2001/0053182 A1 | 12/2001 | Ishiyama | |
| 2002/0003578 A1 * | 1/2002 | Koshiba et al. | 348/273 |
| 2002/0012054 A1 * | 1/2002 | Osamato | 348/273 |
| 2002/0012055 A1 * | 1/2002 | Koshiba et al. | 348/273 |
| 2002/0012398 A1 * | 1/2002 | Zhou et al. | 375/240.25 |
| 2002/0015447 A1 * | 2/2002 | Zhou | 375/240.25 |
| 2002/0027604 A1 * | 3/2002 | Hung | 348/239 |
| 2002/0094031 A1 | 7/2002 | Ngai et al. | |
| 2002/0135683 A1 * | 9/2002 | Tamama et al. | 348/222 |
| 2002/0159528 A1 | 10/2002 | Graziani et al. | |
| 2002/0186774 A1 | 12/2002 | Pau et al. | |
| 2003/0012290 A1 | 1/2003 | Fimoff et al. | |
| 2003/0031251 A1 * | 2/2003 | Koto | 375/240.03 |
| 2003/0039308 A1 | 2/2003 | Wu et al. | |
| 2003/0222998 A1 * | 12/2003 | Yamauchi et al. | 348/262 |
| 2004/0114817 A1 | 6/2004 | Jayant et al. | |
| 2004/0208135 A1 * | 10/2004 | Nakamura et al. | 370/265 |
| 2005/0053302 A1 | 3/2005 | Srinivasan et al. | |
| 2005/0105883 A1 | 5/2005 | Holcomb et al. | |
| 2005/0152448 A1 | 7/2005 | Crinon et al. | |
| 2005/0193408 A1 | 9/2005 | Sull et al. | |
| 2005/0210145 A1 | 9/2005 | Kim et al. | |
| 2005/0286631 A1 | 12/2005 | Wu et al. | |
| 2006/0126713 A1 | 6/2006 | Chou et al. | |
| 2006/0256868 A1 | 11/2006 | Westerman | |
| 2006/0274830 A1 * | 12/2006 | Koto | 375/240.03 |
| 2007/0025441 A1 | 2/2007 | Ugur et al. | |
| 2007/0025446 A1 * | 2/2007 | Matsumoto et al. | 375/240.21 |
| 2007/0074266 A1 | 3/2007 | Raveendran et al. | |
| 2007/0081586 A1 | 4/2007 | Raveendran et al. | |
| 2007/0081587 A1 | 4/2007 | Raveendran et al. | |
| 2007/0081588 A1 | 4/2007 | Raveendran et al. | |
| 2007/0153914 A1 | 7/2007 | Hannuksela et al. | |
| 2008/0080619 A1 | 4/2008 | Heng et al. | |
| 2008/0101466 A1 | 5/2008 | Swenson et al. | |
| 2009/0161766 A1 | 6/2009 | Bronstein et al. | |
| 2009/0168900 A1 * | 7/2009 | Shimoyama et al. | 375/240.26 |
| 2010/0232720 A1 | 9/2010 | Tsai et al. | |
| 2011/0292995 A1 | 12/2011 | Kubota | |

FOREIGN PATENT DOCUMENTS

| | | |
|---|---|---|
| CN | 1937777 A | 3/2007 |
| CN | 101087408 A | 12/2007 |
| EP | 1030523 B1 | 4/2010 |
| JP | 07-184196 A | 7/1995 |
| JP | 10-210475 A | 8/1998 |
| JP | 10-304311 A | 11/1998 |
| JP | 11-112601 A | 4/1999 |
| JP | 2000-209584 A | 7/2000 |
| JP | 2001-359097 A | 12/2001 |
| JP | 2003-092759 A | 3/2003 |
| JP | 2003-125400 A | 4/2003 |
| JP | 2005-072742 A | 3/2005 |
| JP | 2005-080004 A | 3/2005 |
| JP | 2006-180036 A | 7/2006 |
| JP | 2006-295535 A | 10/2006 |
| JP | 2006-332842 A | 12/2006 |
| JP | 2007-28647 A | 2/2007 |
| JP | 2007-208377 A | 8/2007 |
| JP | 2008-109259 A | 5/2008 |
| JP | 2008-252562 A | 10/2008 |
| JP | 2008-258858 A | 10/2008 |
| JP | 2009-260595 A | 11/2009 |
| KR | 10-1995-0030491 A | 11/1995 |
| KR | 10-1996-0009752 A | 3/1996 |
| KR | 10-1997-0025160 A | 5/1997 |
| KR | 10-1997-0032066 A | 6/1997 |
| KR | 10-2001-0030362 A | 4/2001 |
| KR | 10-2008-0061744 A | 7/2008 |
| KR | 10-2009-0112747 A | 10/2009 |
| RU | 2 123 769 C1 | 12/1998 |
| RU | 2385541 C2 | 3/2010 |
| TW | 404137 B | 9/2000 |
| WO | 02/096120 A1 | 11/2002 |

OTHER PUBLICATIONS

Office Action, Taiwanese Patent Application No. 100114408, May 21, 2014.

International Search Report (Japanese and English) for PCT/JP2011/059727, ISA/JP, mailed Jul. 12, 2011.

International Preliminary Report on Patentability (Japanese), IPEA/JP, mailed Aug. 21, 2012.

Notice of Allowance, Japanese Patent Application No. 2012-513784, Jul. 15, 2014.

Decision on Grant, Russian Patent Application No. 2012146549, Jul. 28, 2014.

Office Action, Russian Patent Application No. 2012146549, Jan. 20, 2014.

Notice of Allowance of Patent, Korean Patent Application No. 10-2012-7028198, Jan. 28, 2014.

Li, Z.G., et al., "Adaptive rate control for H.264," Journal of Visual Communication and Image Representation, vol. 17, No. 2, Apr. 2006, pp. 376-406.

Chen, Jiann-Jone, et al., "Source Model for Transform Video Coder and Its Application—Part II: Variable Frame Rate Coding," IEEE Transactions on Circuits and Systems for Video Technology, vol. 7, No. 2, Apr. 1997, pp. 299-311.

Search Report, European Patent Application No. 11777419.0, Nov. 20, 2013.

Notice of Reasons for Rejection, Japanese Patent Application No. 2012-513784, Dec. 20, 2013.

Kadono, Kikuchi, and Suzuki, "H.264/AVC Textbook, Third revised Version" Issued by Impress R & D, 2009, pp. 189-191.

Okutomi, Ozawa, Shimizu, and Hori, "Digital Image Processing," Corporation Picture Information Education Advancement Association, 2004, pp. 108-110.

Westerink, P. H., et al., "Two-pass MPEG-2 variable-bit-rate encoding," IBM Journal of Research and Development, vol. 43, No. 4, Jul. 1999, pp. 471-488.

(56) References Cited

OTHER PUBLICATIONS

Ma, Siwei, et al., "Rate Control for JVT Video Coding Scheme with HRD Considerations," Proceedings of 2003 International Conference on Image Processing, Sep. 14-17, 2003, pp. III-793-III-796.
International Search Report for PCT/JP2011/060364, ISA/JP, mailed Jun. 21, 2011.
Notice of Allowance of Patent, Korean Patent Application No. 10-2012-7028798, Jan. 28, 2014.
Search Report, European Patent Application No. 11777442.2, Mar. 6, 2014.
Decision on Grant, Russian Patent Application No. 2012146537, May 26, 2014.
Office Action, U.S. Appl. No. 13/695,700, Jan. 5, 2015.
Office Action, Chinese Patent Application No. 201180022113.6, Feb. 2, 2015.
Notice of Allowance, Taiwanese Patent Application No. 100115438, Feb. 26, 2015.
Notice of Allowance, U.S. Appl. No. 13/695,700, Jul. 7, 2015.
Office Action, Canadian Patent Application No. 2,798,012, Aug. 7, 2015.

* cited by examiner

VIDEO ENCODING CONTROL METHOD AND APPARATUS

TECHNICAL FIELD

The present invention relates to a video encoding technique, and in particular, to a technique for preventing degradation in image quality while suppressing the amount of code generated for an encoding target picture so that no buffer underflow occurs on the decoding side.

Priority is claimed on Japanese Patent Application No. 2010-106104, filed May 6, 2010, the contents of which are incorporated herein by reference.

BACKGROUND ART

In an ordinary decoder, received encoded data is stored in a buffer until the data is decoded to be displayed. The decoded encoded data is withdrawn from the buffer.

When encoding a video image, the state of the decoder-side buffer should be considered so as to prevent a result that the video cannot be decoded. Accordingly, a test using a virtual decoder buffer is performed during the encoding, so as to ensure that the decoding will succeed.

The decoder buffer has two abnormal states, that is, overflow and underflow.

In the overflow, encoded data reaches the decoder at a speed higher than a speed for decoding and displaying the data. If receiving encoded data at a speed higher than the decoding and displaying speed, the amount of code for the received data is larger than the amount of code for data withdrawn from the buffer, so that the amount of received data may exceed the capacity of the decoder buffer. In a known measure to prevent the overflow of the decoder buffer, useless data (for data staffing or filling) are inserted so as to reduce the speed for receiving necessary data, thereby preventing the overflow.

In contrast, in the underflow, necessary encoded data has not yet been received when decoding and displaying the data. In order to prevent the underflow, an appropriate target amount of code for preventing the underflow may be set so as to control the amount of generated code. In another method using a picture skip technique, the number of pictures to be encoded is reduced so as to prevent the underflow. Both methods prevent the underflow by suppressing the amount of generated code.

For example, Patent Document 1 discloses a method which performs a decoder buffer examination for determining whether or not an underflow has occurred. If an underflow has occurred, original encoded data is replaced with skip encoded data.

FIG. 7 shows an operation flow of an underflow prevention method in conventional video encoding.

First, in the decoder buffer examination, it is determined whether or not an underflow has occurred (see step S100). If an underflow is detected, the amount of generated code is suppressed through a generated code amount control process (see step S101).

Suppression of the amount of generated code may be performed by a control method for reducing the difference between the amount of generated code and the target amount of code, a method of skipping a picture for which an underflow is detected, or a method of generating dummy encoded data which produces a minimum amount of generated code.

The detection of occurrence of the underflow is executed before or after the relevant encoding.

If executing the underflow detection after the encoding, an encoded stream of the picture for which the underflow has been detected should be cancelled.

In addition, the rate of occupancy in the decoder buffer immediately before the decoding of a picture at time t can be computed by the following formula.

$$B(t)=B(0)+R*t-\Sigma G(i)$$

where $B(0)$ is an initial value of the rate of occupancy in the decoder buffer, R denotes a bit rate, and $G(i)$ denotes the amount of code generated for a picture at time i.

PRIOR ART DOCUMENT

Patent Document

Patent Document 1: Japanese Unexamined Patent Application, First Publication No. 2005-72742.

DISCLOSURE OF INVENTION

Problem to be Solved by the Invention

A situation in which the underflow tends to occur, that is, the rate of occupancy in the decoder buffer decreases occurs when the amount of generated code is relatively large with respect to the bit rate.

FIG. 8 shows an example of transition in the rate of occupancy in the decoder buffer. In FIG. 8, in each of parts indicated by "A", an underflow (indicated by a dotted line) occurred and thus the relevant picture was skipped. In a part indicated by "B", the amount of generated code is kept at a suppressed low level because the rate of buffer occupancy is kept low after the above picture was skipped.

When the rate of buffer occupancy is low, the amount of generated code should be suppressed so as to prevent the underflow. However, in a case in which complex video images (e.g., including any textures) continue, if the amount of generated code is extremely suppressed, a distortion in the encoding clearly appears. Such a state continues until the corresponding complex scene ends and the rate of occupancy in the decoder buffer returns to an appropriate level.

Conventional methods thus have a problem in which when the rate of occupancy in the decoder buffer decreases, degradation in the decoded image is prominent for a certain time.

In order to solve the problem, Patent Document 1 discloses a method of preferentially skipping a B picture which is not referred to by another picture.

However, B pictures originally generate a relatively small amount of code, and the number of B pictures to be inserted is restricted. Therefore, even with skipping, a considerable period of time is required until the rate of occupancy in the decoder buffer returns to an appropriate level. This means that a state in which the amount of generated code is suppressed and the image quality is degraded continues for a considerable period of time.

Therefore, an object of the present invention is to solve the problem accompanied with a decrease in the rate of occupancy of the decoder buffer, for which degradation in the decoded image clearly appears for a certain time in conventional methods, and to prevent degradation in quality of an encoding target picture after an underflow is detected.

Means for Solving the Problem

In order to achieve the above object, the present invention provides a video encoding control method for controlling encoding of an input video signal, the method comprising the steps of:

detecting an underflow of a decoder buffer;

if the underflow of the decoder buffer has been detected, suppressing an amount of generated code by skipping an encoding target picture or by encoding the encoding target picture so as to produce a minimum amount of generated code;

after suppressing the amount of generated code, comparing a current rate of occupancy in the decoder buffer with a predetermined threshold for the rate of occupancy in the decoder buffer; and performing a control for continuously suppressing the amount of code generated for each encoding target image by using the above step of suppressing the amount of generated code until the rate of occupancy in the decoder buffer exceeds the threshold based on a result of the above comparison.

The present invention also provides a video encoding control method for controlling encoding of an input video signal, the method comprising the steps of:

detecting an underflow of a decoder buffer;

if the underflow of the decoder buffer has been detected, computing a period of time for suppressing an amount of generated code based on a predetermined threshold for a rate of occupancy in the decoder buffer and an encoding bit rate; and performing a control for continuously suppressing the amount of code generated for each encoding target image during the computed period of time, by skipping the encoding target picture or by encoding the encoding target picture so as to produce a minimum amount of generated code.

The present invention also provides a video encoding control apparatus for controlling encoding of an input video signal, the apparatus comprising:

a device that detects an underflow of a decoder buffer;

a device that suppresses an amount of generated code by skipping an encoding target picture or by encoding the encoding target picture so as to produce a minimum amount of generated code;

a device that compares a current rate of occupancy in the decoder buffer with a predetermined threshold for the rate of occupancy in the decoder buffer; and a device that performs, if the underflow of the decoder buffer has been detected, a control for continuously suppressing the amount of code generated for each encoding target image by using the above device that suppresses the amount of generated code until the rate of occupancy in the decoder buffer exceeds the threshold.

The present invention also provides a video encoding control apparatus for controlling encoding of an input video signal, the apparatus comprising:

a device that detects an underflow of a decoder buffer;

a device that suppresses an amount of generated code by skipping an encoding target picture or by encoding the encoding target picture so as to produce a minimum amount of generated code;

a device that computes a period of time for suppressing an amount of generated code based on a predetermined threshold for a rate of occupancy in the decoder buffer and an encoding bit rate; and a device that performs, if the underflow of the decoder buffer has been detected, a control for continuously suppressing the amount of code generated for each encoding target image during the computed period of time, by using the above device that suppresses the amount of generated code.

Effect of the Invention

In accordance with the present invention, the amount of generated code can be suppressed until the rate of occupancy in the decoder buffer exceeds a threshold. Therefore, after detecting an underflow, it is unnecessary to continuously keep suppressing the amount of generated code so as to prevent the underflow. Accordingly, image quality can be improved.

MODE FOR CARRYING OUT THE INVENTION

First, the present invention is generally explained.

When the rate of occupancy in the decoder buffer decreases, degradation in the decoded image clearly appears for a certain period of time. This is because the amount of generated code is suppressed due to a low level (i.e., of the rate of occupancy) of the decoder buffer.

Therefore, in order to restore an appropriate level of the decoder buffer, the present invention performs a process (such as picture skipping) of minimizing the amount of code for a specific period of time. The minimization of the amount of generated code is continued until the level of the decoder buffer exceeds a predetermined threshold.

Figure 1:
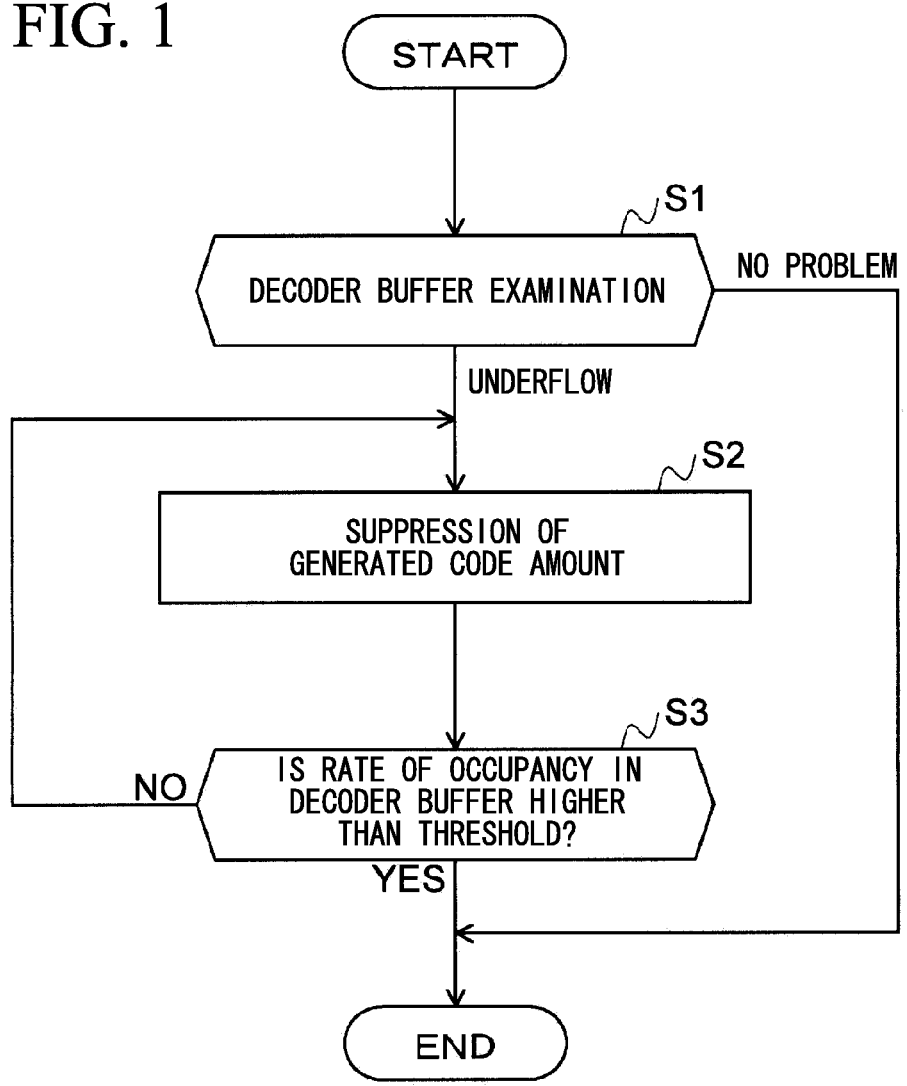
FIG. 1 is a flowchart of a video encoding control, so as to generally explain the present invention.

FIG. 1 is a flowchart of a video encoding control, so as to generally explain the present invention.

First, similar to conventional methods, a decoder buffer examination is executed (see step S1). If no problem is detected in the examination, the encoding process is continued.

If an underflow has been detected, a process for suppressing the amount of generated code is performed by subjecting an encoding target picture to skip or encode with a minimum amount of generated code, similar to conventional methods (see step S2).

Next, it is determined whether or not the rate of occupancy in the decoder buffer exceeds a predetermined threshold (see step S3).

If the rate is still under the threshold, the next picture input after the current encoding target picture is defined as a new encoding target picture, for which a generated code amount suppression process is executed (see step S2).

Such a process is iterated until the rate of occupancy in the decoder buffer exceeds the predetermined threshold.

As described above, in the present invention, a threshold for stopping the generated code amount suppressing means (e.g., picture skipping) is independently set in addition to a threshold for detecting a decoder buffer underflow, and a generated code amount suppressing process is continuously performed by the generated code amount suppressing means until the rate of occupancy in the decoder buffer exceeds a threshold. When the rate of occupancy exceeds the threshold, the operation returns to the ordinary encoding process.

According to such a method, it is possible to concentratedly suppress the generated code amount for a short period of time, thereby preventing degradation in the quality of the encoding target picture after an underflow of the decoder buffer is detected.

Although there is no point in setting the predetermined threshold to an extremely low level, an extremely high level increases the period of time for suppressing the generated code amount. Therefore, the threshold may be:

(i) half the maximum buffer size (approximately 40% to 6% of the maximum size); or
(ii) an initial buffer level when decoding of an encoding stream is started.

Below, specific embodiments of the present invention will be explained by referring to the drawings.

Figure 2:
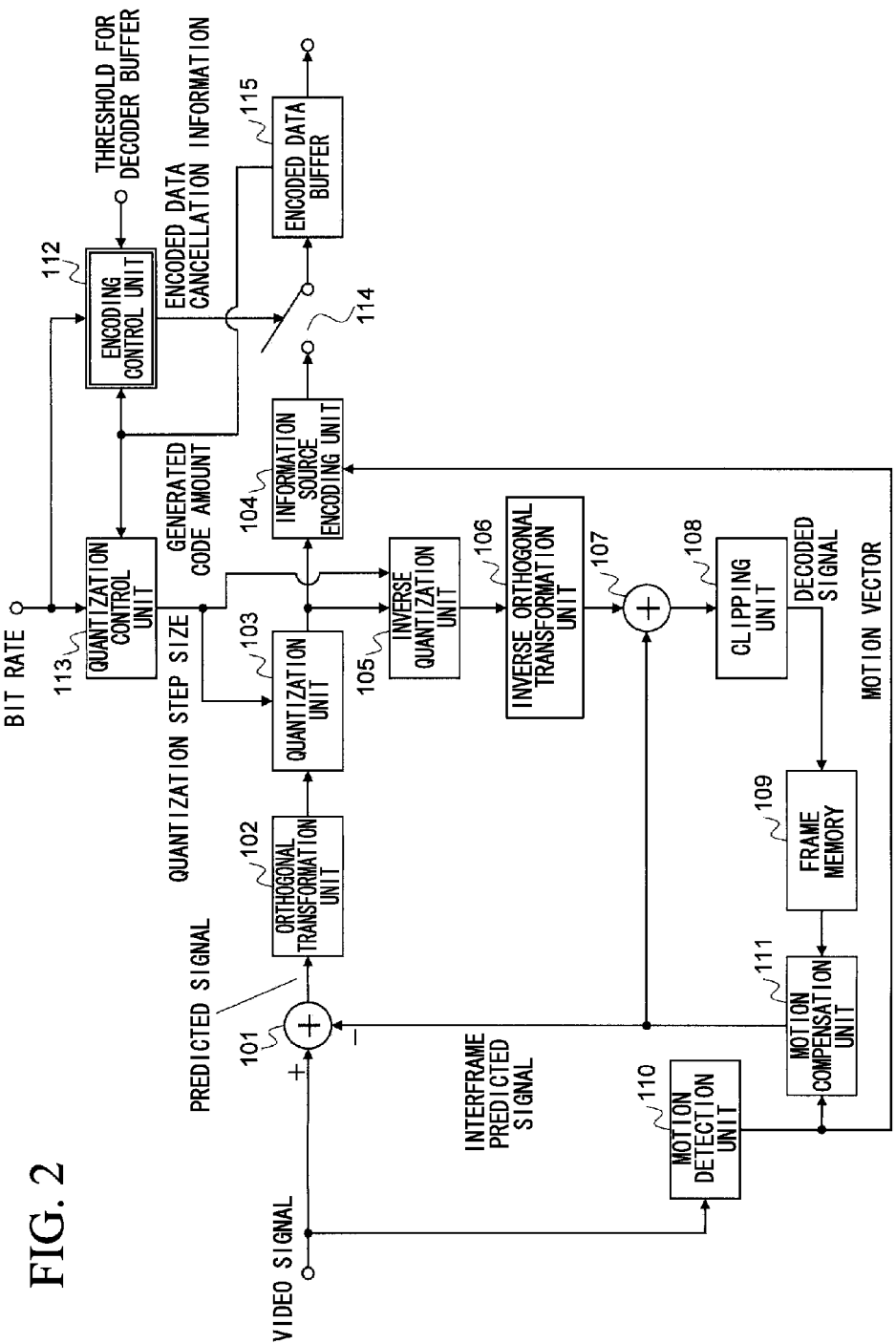
FIG. 2 is a diagram showing an example structure of the apparatus of an embodiment of the present invention.

FIG. 2 is a diagram showing an example structure of the apparatus of an embodiment of the present invention. In FIG. 2, parts other than an encoding control unit 112 are generally similar to those in an apparatus which executes video encoding based on known MPEG-2, H.264, or the like.

A predicted signal generating unit 101 generates a predicted signal based on a residual between an input video signal and an interframe predicted signal.

This predicted signal is input into an orthogonal transformation unit 102, which outputs transform coefficients obtained by an orthogonal transformation (e.g., DCT transform).

The transform coefficients are input into a quantization unit 103, where they are quantized in accordance with a quantization step size set by a quantization control unit 113.

The quantized transform coefficients are input into an information source encoding unit 104, where they are subjected to entropy encoding.

The encoded data output from the information source encoding unit 104 is stored via a switching unit 114 into an encoded data buffer 115.

Simultaneously, the quantized transform coefficients are subjected to inverse quantization in an inverse quantization unit 105, and further to an inverse orthogonal transformation in an inverse orthogonal transformation unit 106, thereby generating a decoded predicted signal.

This decoded predicted signal is added to the interframe predicted signal in an adder 107, thereby generating a decoded signal.

The decoded signal is subjected to clipping in a clipping unit 108, and is then stored in a frame memory 109 so as to be used as a reference image in the predictive encoding of the next frame.

A motion detection unit 110 performs motion detection of the input video signal by means of motion search, and outputs an obtained motion vector to a motion compensation unit 111 and the information source encoding unit 104.

The information source encoding unit 104 performs entropy encoding of the motion vector.

The motion compensation unit 111 refers to the frame memory 109 in accordance with the motion vector, so as to generate the interframe predicted signal.

In the present embodiment, underflow detection is executed after the encoding process, and an assumed process for suppressing the amount of generated code is picture skipping.

The encoding control unit 112 receives an encoding bit rate and the amount of generated code sent from the encoded data buffer 115, and computes the rate of occupancy in a decoder buffer on the decoding side.

If an underflow of the decoder buffer is detected, the encoding control unit 112 outputs encoded data cancellation information to the switching unit 114, so that encoded data of the corresponding picture is cancelled by opening the relevant switch (i.e., picture skipping). The open state of this switch is maintained, that is, picture skipping is continued until the rate of occupancy in the decoder buffer exceeds a threshold.

When the rate of occupancy in the decoder buffer exceeds the threshold, the switch is closed, so that the encoded data generated in the information source encoding unit 104 is set to the encoded data buffer 115.

Figure 3:
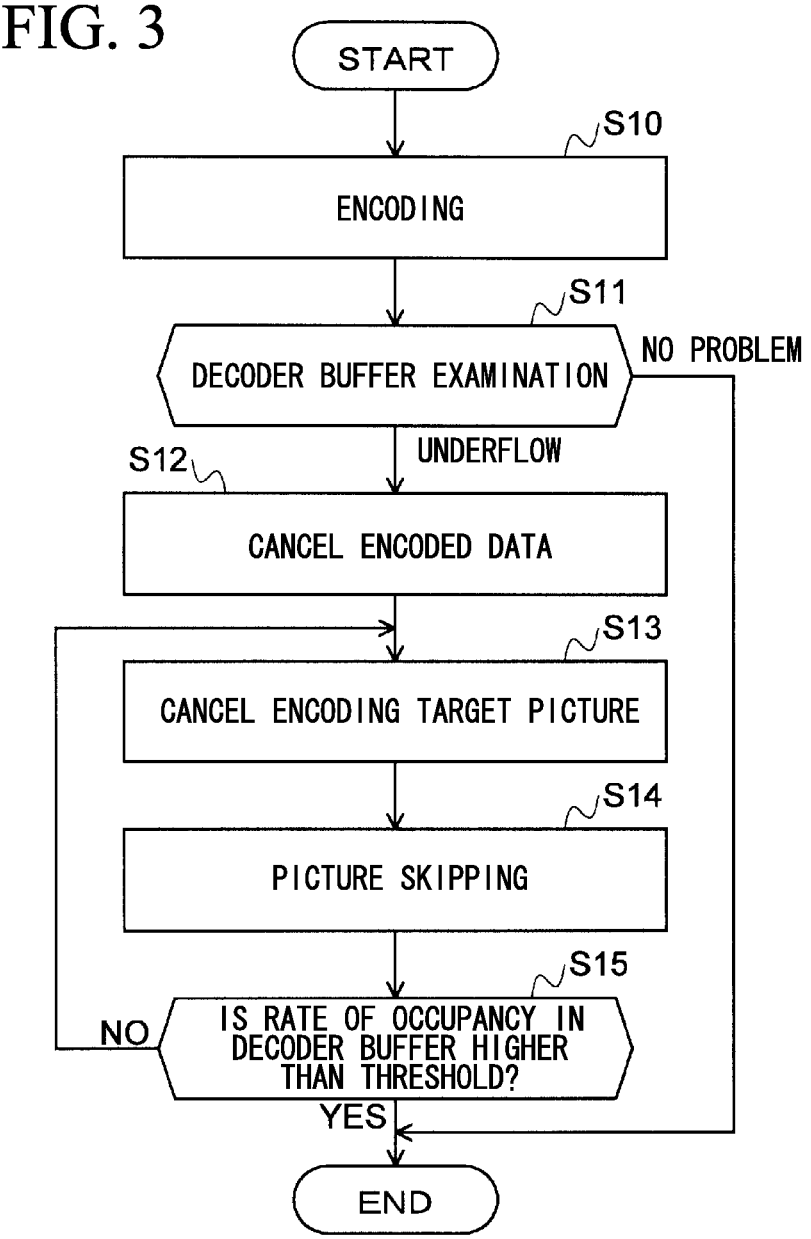
FIG. 3 is a flowchart showing the operation of the embodiment.

FIG. 3 is a flowchart showing the operation of the present embodiment.

First, the encoding target picture is encoded (see step S10). Next, examination of the decoder buffer is executed (see step S11). If no problem is found in the examination, the operation applied to the encoding target picture is completed.

If an underflow is found, encoded data that is a result of the encoding of the encoding target picture is cancelled, and a threshold is set for the rate of occupancy in the decoder buffer (see step S12).

Then the encoding target picture is cancelled (see step S13), and encoded data corresponding to the picture skipping is generated (see step S14).

After that, the rate of occupancy in the decoder buffer is compared with the threshold (see step S15).

According to the comparison, if the rate of occupancy in the decoder buffer is lower than or equal to the threshold, the input picture next to the current encoding target picture is determined to be a new encoding target picture, for which the cancellation of the encoding target picture (step S13) and the encoded data generation for the picture skipping (step S14) are performed again.

If the result of the comparison indicates that the relevant rate is higher than the threshold, the operation of suppressing the generated code amount according to the present encoding control is completed.

Figure 4:
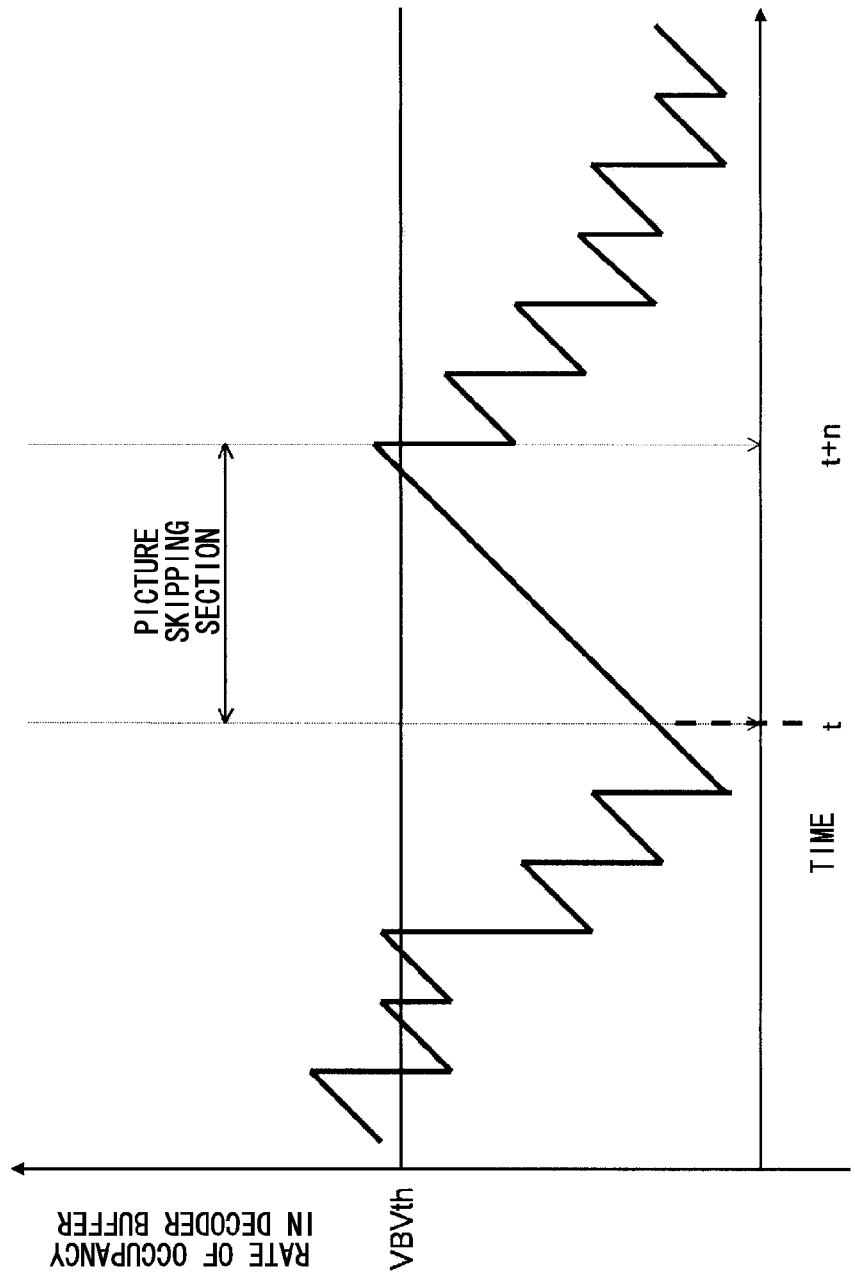
FIG. 4 is a diagram showing an example of transition in the rate of occupancy in the decoder buffer in the embodiment.

FIG. 4 shows an example of transition in the rate of occupancy in the decoder buffer in the present embodiment.

In the present embodiment, if an underflow is detected at time t, picture skipping is continued up to time t+n when the rate of occupancy in the decoder buffer exceeds a relevant threshold VBVth.

Since the amount of code generated for the picture skipping can be estimated to be almost 0, the rate of occupancy in the decoder buffer increases along a slope according to the bit rate for a time from t to t+n.

In the present embodiment, the picture skipping is iterated until the rate of occupancy in the decoder buffer exceeds the threshold. However, the number of pictures to be skipped may be computed in advance, based on the rate of occupancy at the time when the underflow was detected and the threshold.

Here, it is assumed that the buffer occupancy level at the time when the underflow was detected is B(t0), R denotes the bit rate, Gs denotes the amount of code generated for the picture skipping, and Bth denotes a predetermined threshold.

Then a natural number which exceeds n computed by the following formula can be determined to be the number of skipped pictures:

$$n=(Bth-B(t0))/(R-Gs)$$

If the amount of code generated for the picture skipping is 0, the following formula is used:

$$n=(Bth-B(t0))/R$$

Figure 5:
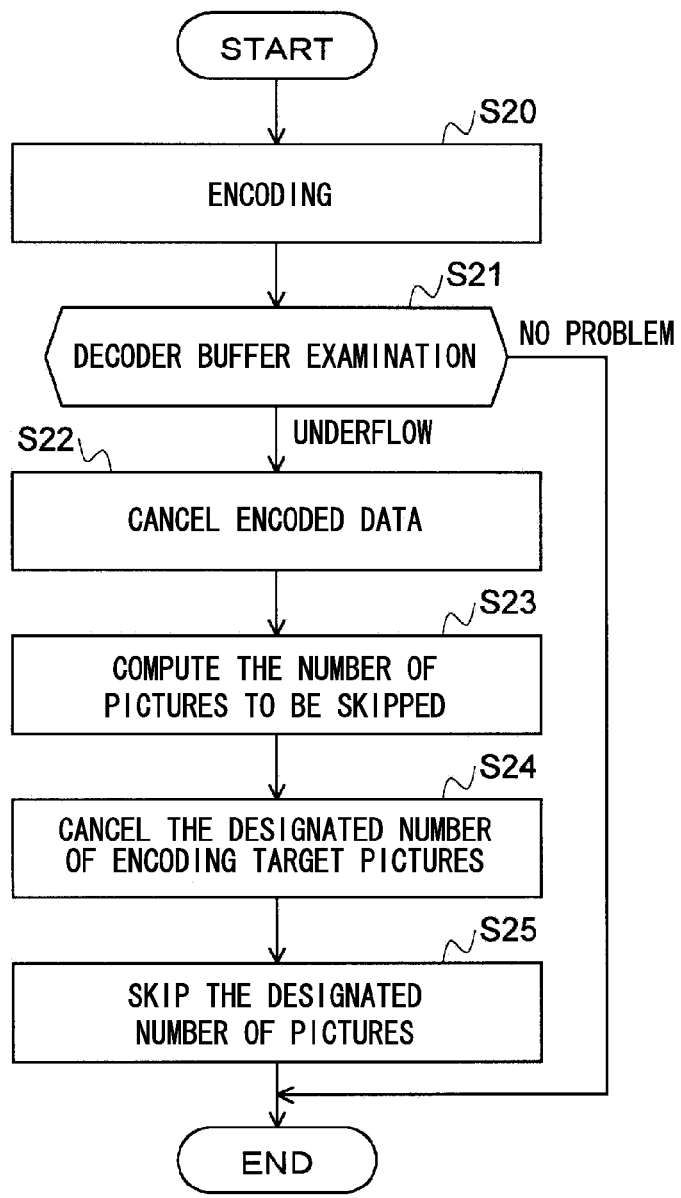
FIG. 5 is a flowchart showing the operation of another embodiment.

FIG. 5 is a flowchart applied to the above case (variation of the embodiment).

First, the encoding target picture is encoded (see step S20).

Next, the examination of the decoder buffer is performed (see step S21). If no problem is found in the examination, the operation applied to the encoding target picture is completed.

If an underflow is found, encoded data that is a result of the encoding of the encoding target picture is cancelled (see step S22).

Next, computation of the number of pictures to be skipped is performed by computing the above-described n (see step S23). Then the computed number (for picture skipping) of encoding target pictures are cancelled (see step S24), and encoded data for the picture skipping in which the number of skipped pictures is designated is generated (see step S25).

After that, the operation of suppressing the generated code amount according to the present encoding control is completed.

As described above, in comparison with the flow in FIG. 3 which performs the shown iteration, this variation has distinctive features of computing the number of skipped pictures (step S23), then cancelling the designated number of encoding target pictures (step S24), and skipping the designated number of pictures (step S25).

Instead of computing the number of skipped pictures, similar effects can be obtained by computing a period of time for suppressing the amount of generated code by means of the picture skipping or the like. In other words, the number of pictures and the above period of time are taken as substantially synonymous with each other.

Although the picture skipping is used as the generated code amount suppressing means in the present embodiment, encoding may also be performed using (i) a maximum quantization step size or quantization matrix, (ii) a mode which produces a minimum amount of generated code (e.g., macroblock skipping), or the like.

Figure 6:
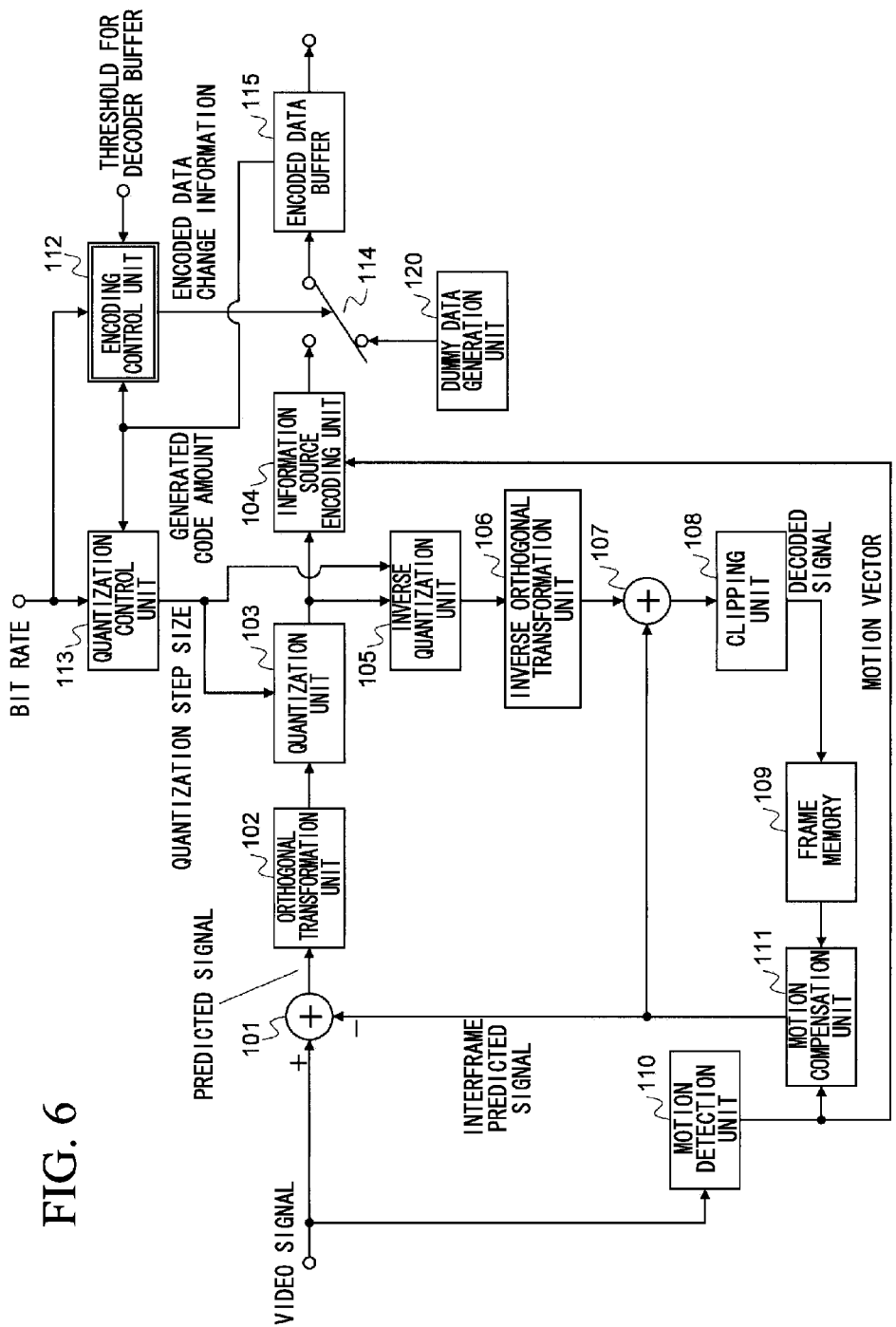
FIG. 6 is a diagram showing an example structure of the apparatus of another embodiment.
Figure 7:
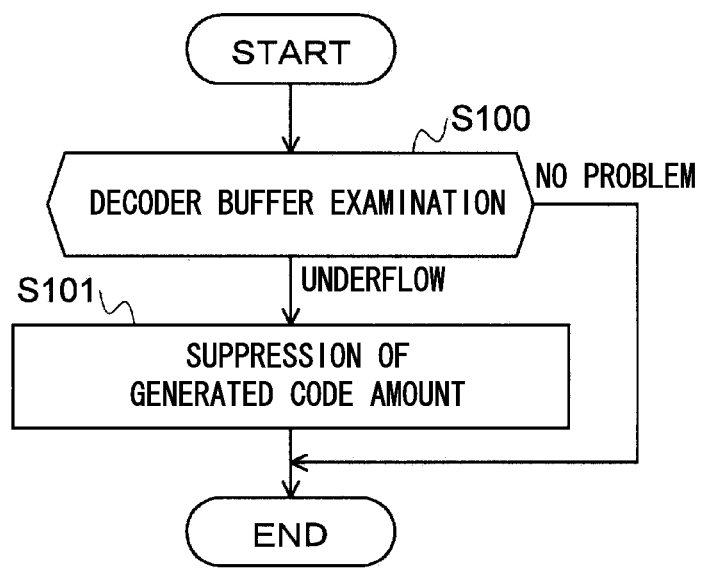
FIG. 7 is a diagram showing an operation flow of an underflow prevention method in conventional video encoding.
Figure 8:
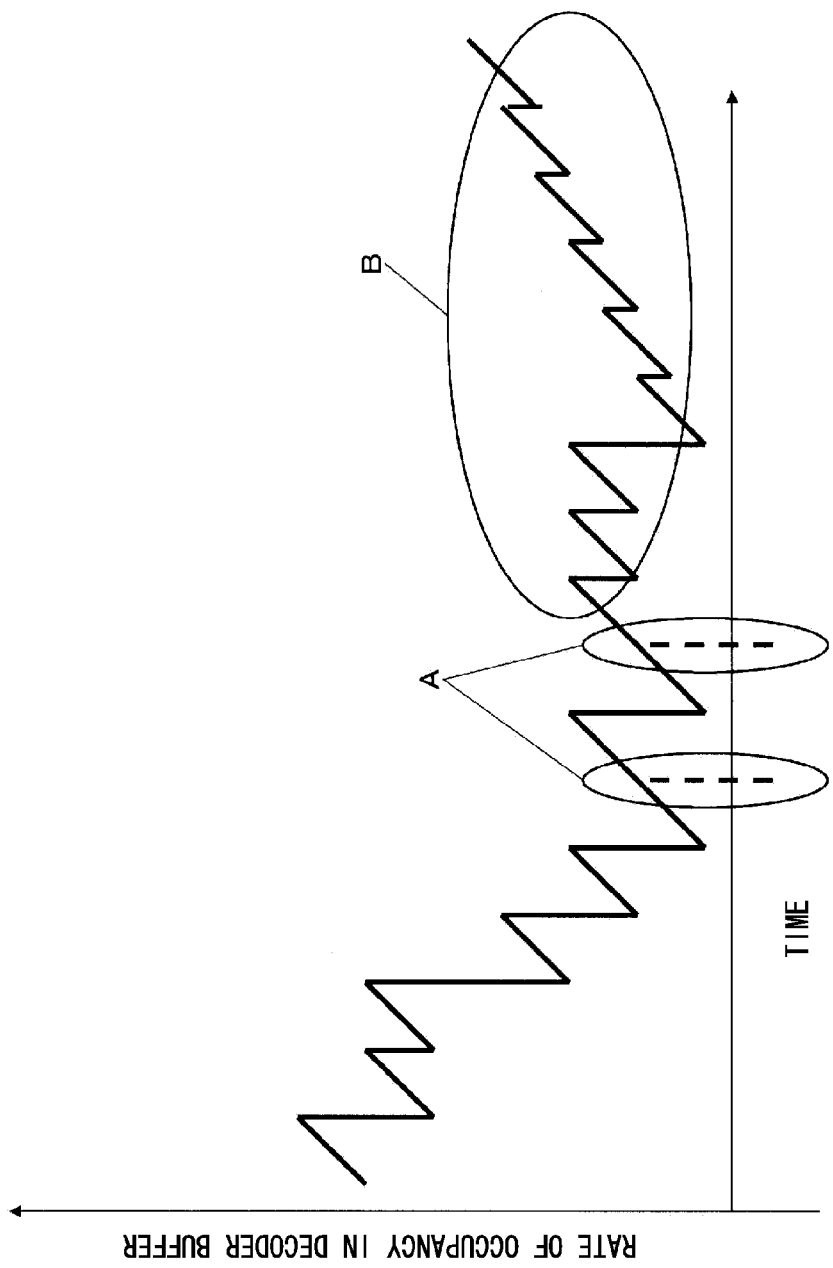
FIG. 8 is a diagram showing an example of transition in the rate of occupancy in the decoder buffer when using a conventional technique.

FIG. 6 is a diagram showing the structure of an embodiment applicable to an embodiment in which dummy data which produces a minimum amount of generated code is inserted, instead of performing the picture skipping.

In the above-explained FIG. 2, the picture skipping is implemented by cancelling the relevant encoded data. However, in FIG. 6, instead of cancelling the encoded data, encoded data generated by a dummy data generation unit 120 is inserted. The other units are identical to those shown in FIG. 2.

In addition, although the above-described embodiments execute the encoding so as to determine whether or not an underflow is found, the amount of generated code may be estimated without executing the encoding so as to detect the occurrence of the underflow. In this case, cancellation of the encoded data is unnecessary.

In the above embodiments, the threshold for the rate of occupancy in the decoder buffer may be set to substantially half the buffer size on the decoding side, or the level of the decoder buffer immediately before the decoding side receives encoded data of the head picture and starts decoding of the encoded data. In either case, an appropriately threshold which is not too high or low can be obtained.

Additionally, in the embodiments, the overflow of the decoder buffer is unconsidered.

In order to handle the overflow, it is necessary to determine whether the overflow is found, based on information about the maximum buffer size.

The above-described video encoding control operation may be implemented using a computer and a software program, and the software program may be stored in a computer-readable storage medium or provided via a network.

INDUSTRIAL APPLICABILITY

In accordance with the present invention, the amount of generated code can be suppressed until the rate of occupancy in the decoder buffer exceeds a threshold. Therefore, after detecting an underflow, it is unnecessary to continuously keep suppressing the amount of generated code so as to prevent the underflow. Accordingly, image quality can be improved.

REFERENCE SYMBOLS 101 predicted signal generating unit
102 orthogonal transformation unit
103 quantization unit
104 information source encoding unit
105 inverse quantization unit
106 inverse orthogonal transformation unit
107 adder
108 clipping unit
109 frame memory
110 motion detection unit
111 motion compensation unit
112 encoding control unit
113 quantization control unit
114 switching unit
115 encoded data buffer
120 dummy data generation unit

The invention claimed is:

1. A video encoding control method performed by a microprocessor operating on executable program steps stored in memory for controlling encoding of an input video signal, the method comprising the steps of:
    detecting an underflow of a decoder buffer;
    if the underflow of the decoder buffer has been detected, computing a period of time for suppressing an amount of generated code based on a predetermined threshold for a rate of occupancy in the decoder buffer and an encoding bit rate; and
    performing a control for continuously suppressing the amount of code generated for each encoding target picture during the computed period of time, by skipping the encoding target picture or by encoding the encoding target picture so as to produce a minimum amount of generated code.

2. The method in accordance with claim 1, wherein:
    the threshold for the rate of occupancy in the decoder buffer is one of substantially half the size of the decoder buffer and a level of the decoder buffer immediately before the decoding side receives encoded data of a head picture and starts decoding thereof.

3. A video encoding control apparatus for controlling encoding of an input video signal, the apparatus comprising:
    a device that detects an underflow of a decoder buffer;
    a device that suppresses an amount of generated code by skipping an encoding target picture or by encoding the encoding target picture so as to produce a minimum amount of generated code;
    a device that computes a period of time for suppressing an amount of generated code based on a predetermined threshold for a rate of occupancy in the decoder buffer and an encoding bit rate; and
    a device that performs, if the underflow of the decoder buffer has been detected, a control for continuously suppressing the amount of code generated for each encoding target picture during the computed period of time, by using the above device that suppresses the amount of generated code.

4. A non-transitory computer-readable storage medium which stores a video encoding control program by which a computer executes the video encoding control method comprising the steps of:
    detecting an underflow of a decoder buffer;
    if the underflow of the decoder buffer has been detected, computing a period of time for suppressing an amount of generated code based on a predetermined threshold for a rate of occupancy in the decoder buffer and an encoding bit rate; and
    performing a control for continuously suppressing the amount of code generated for each encoding target picture during the computed period of time, by skipping the encoding target picture or by encoding the encoding target picture so as to produce a minimum amount of generated code.

\* \* \* \* \*